(12) United States Patent
Scouten

(10) Patent No.: US 6,357,038 B1
(45) Date of Patent: *Mar. 12, 2002

(54) CROSS PLATFORM AND CROSS OPERATING SYSTEM MACROS

(75) Inventor: Eric A. Scouten, St. Paul, MN (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,167

(22) Filed: Apr. 13, 1998

(51) Int. Cl.$^7$ .................................................. G06F 9/45
(52) U.S. Cl. ............................................. 717/3; 717/1
(58) Field of Search .......................... 395/703, 685, 395/200.36, 704; 345/348, 335, 331; 324/760; 714/738; 717/3, 4, 1; 703/26, 27, 28

(56) References Cited

U.S. PATENT DOCUMENTS

| | | | | |
|---|---|---|---|---|
| 5,101,494 A | * | 3/1992 | Bilski et al. ..................... 717/4 |
| 5,363,507 A | * | 11/1994 | Nakayama et al. ......... 345/743 |
| 5,404,528 A | * | 4/1995 | Mahajan ..................... 209/320 |
| 5,410,700 A | * | 4/1995 | Fecteau et al. ............. 709/100 |
| 5,412,772 A | * | 5/1995 | Monson ...................... 345/746 |
| 5,442,791 A | * | 8/1995 | Wrabetz et al. ............. 709/330 |
| 5,543,727 A | * | 8/1996 | Bushard et al. ............. 324/760 |
| 5,557,740 A | * | 9/1996 | Johnson et al. ............... 714/38 |
| 5,669,000 A | * | 9/1997 | Jessen et al. ................... 717/4 |
| 5,715,458 A | * | 2/1998 | Holder et al. ............... 709/319 |
| 5,754,755 A | * | 5/1998 | Smith, Jr. 714 ............... 714/38 |
| 5,805,811 A | * | 9/1998 | Pratt et al. .................. 709/206 |

OTHER PUBLICATIONS

Autoconf Makes for Portable Software, BYTE, Nov. 1997.*
Macro–creation utilities, Macworld v13, n12, Dec. 1, 1996.*
Easy Target Compilation, Forth Dimensions, v19, Issue 5, pp. 9–14, Jan. 1998.*

* cited by examiner

Primary Examiner—Mark R. Powell
Assistant Examiner—Hoang-Vu Antony Nguyen-Ba
(74) Attorney, Agent, or Firm—Fish & Richardson P.C.

(57) ABSTRACT

A macro for use by an application program is described. The macro is embedded in a macro file including at least two versions of executable configuration code corresponding to two different operating systems to interface the macro file to an application program. Attached to the macro file is a sequence of actions to apply to an application file produced by the application program. Also attached is application identification information that identifies an original host application corresponding to the macro. The sequence of actions in the macro file can be produced by storing commands, applied to a data file opened in the application program, into a log file and transferring at least one stored command from the log file to the macro file.

10 Claims, 12 Drawing Sheets

CROSS PLATFORM AND CROSS OPERATING SYSTEM MACROS

BACKGROUND

This invention relates to computer application macros.

Most computer applications have macro generators for producing macros or user definable list of actions to perform on an data file. In a typical macro generator, a user enters a macro record mode and can select a sequence of actions to apply to the data file. The sequence of actions (i.e., macro) are stored in a macro file. Actions are added to the macro file until the macro recording is ended by some action of the user. The macro file is typically packaged in the application program and stored in a form that can later be executed by the application program. At a later time, the macro file can be applied to a data file opened in the application program. Macros can be produced to manipulate data within the data file, reformat data in the data file and so forth.

The actions in the macro file are applied to the data file by opening the data file within the application program and executing the macro. Thus, to apply the macro to a series of data files, each of the data files are opened in the application and the macro is applied in turn to each data file.

SUMMARY

According to one aspect of the invention, a method of producing a macro for use by an application program includes producing a macro file including at least two versions of executable configuration code corresponding to two different operating systems to interface the macro file to an application program and attaching to the macro file a sequence of actions to apply to an application file produced by the application program. The method also includes attaching application identification information to the macro file that identifies an original host application corresponding to the macro.

The method permits packaging of the sequence of actions into an executable file and inserting a call to the application program into the executable file. The macro file can be stored independent of the application program at an address location outside of the application program address space. The macro file can be stored on a computer storage medium or in a location corresponding to a computer desktop folder such that an icon pointing to the macro file can be displayed on a computer display.

According to a still further aspect of the invention, a computer program product residing on a computer readable medium for producing a macro for use by an application program includes instructions for causing a computer produce a macro file including executable configuration code to interface the macro file to an application program and attach to the macro file a sequence of actions to apply to an application file produced by the application program. The program product also attaches application identification information to the macro file that identifies an original host application corresponding to the macro.

According to another aspect of the invention, a method of applying a macro to a data file associated with an application program includes moving an icon representation of the data file to a macro icon representative of the macro file. In response the macro file cause an execution of a call to the application process. The application process executes and applies a sequence of actions in the macro file to the data file.

The method executes a call by passing a location of the file to the application program and passing the list of operations to the application program. The method can have the application file produced in a first environment. The macro file can include executable configuration code written for the first environment and a second, different environment, and executes the code for the first environment. The method can have the executable code for the first application stored in a data fork structure. If executable code for the first environment requires the executable configuration code stored in a resource fork structure, the method executes the host application, opening the macro file in the host application. The host application will detect that the resource fork data is missing and regenerate the executable code.

According to another aspect of the invention, a data structure stored on a computer readable medium representing a macro file includes a field for executable configuration code for invoking an application program, a field corresponding to an executable call to the application program and a script file corresponding to a list of actions that are applied to an application program file.

The user produces a sequence of actions within an application program and stores the sequence of actions as an executable macro file. The macro file includes an executable macro and sufficient executable information to invoke the original application. An icon corresponding to the executable macro file can be placed on the desktop. Thus, the macro can takes advantage of the so-called drag and drop features common in window-type operating systems. The user can drag any number of data files to the macro icon and the macro file will set up a sequence of operations to call a host application that can apply the actions in the macro to each of the data files. This makes initiation of batch type operation easier.

DETAILED DESCRIPTION

Figure 1:
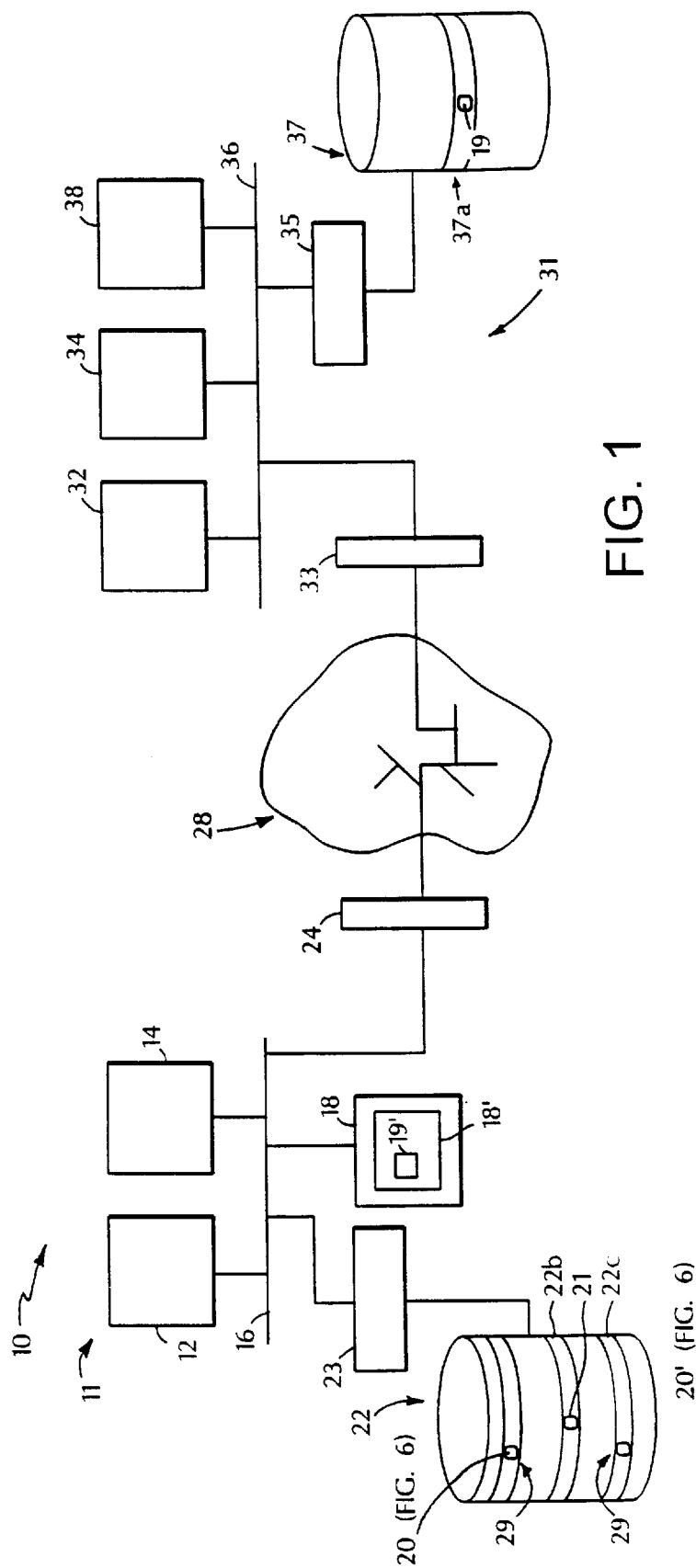
FIG. 1 is a block diagram of a network computer system in a heterogeneous environment.

Referring now to FIG. 1, a networked computer system 10 includes a first computer system 11 including a processor 12, a main memory 14, display 18, storage adapter 20 and network adapter 24 coupled via a computer system bus 16. The storage adapter 23 couples a storage device 22 such as a hard disk drive to the system bus 16.

The first computer system 11 is coupled to a second remote computer system 31 via a link such as network adapters 24 and 34 and network 28. Remote computer system 31 (e.g., a server for system 11) includes a processor 32, main memory 34, and storage adapter 35 coupled via a computer system bus 36. The storage adapter 35 couples a disk drive 37 to the system bus 36.

Computer system 11 can operate under a first operating system such as a windows-type operating system (e.g., Windows 3.1® Windows95®, Windows NT® (Microsoft Corporation, Redmond, Wash.); whereas, computer system 31 can operate under a different windows-type operating system, e.g., Windows95® or a different operating system such as the Macintosh® (Apple Computer, Inc.) operating system or an operating system such as Unix® (The Open Group).

Residing on disk drive 22 is a desktop folder 22a. The desktop folder 22a includes a macro file 19 associated with an application program 22b. The desktop folder 22a can include a plurality of files that in conjunction with a computer operating system (not shown) renders a plurality of icons on the computer display 18 such as icon 19'. Such icons can be selected by a user to execute application programs (e.g., application program 22b) on the computer system 11. The application program 22b also includes one or a plurality of data files 21 that were produced with the application program 22b. A data file 21 is typically a file generated by a user executing an application program and is any file that the application program 22b can understand. The computer disk drive 22 has a second copy of the macro file 19 stored in a second folder 22c. Folder 22c is a general folder in the file system of the operating system (not shown). A folder is a user interface that often corresponds to a directory structure element in the file system. Residing on the disk drive 37 in remote system 31 is a third instance of the macro 19.

As illustrated, a rendition of a desktop 18' is provided on display 18 during operation of the computer system 11. The desktop rendition 18' includes a plurality of icons (only one of which is shown) that correspond to application programs which can be executed by a user. One of these icons is a macro icon 19' that corresponds to one of the instantiations of the macro file 19. Three instantiations of macro 19 are illustrated to show that the macro file 19 can be stored in various locations (e.g., within a local folder 22c of the computer system 11, within the desktop folder 22a of the computer system 11, or remotely stored in a folder 37a. Only one of those instantiations would be associated with icon 19'.

The user produces a sequence of actions within an application program and stores the sequence of actions as an executable macro file 19. The icon 19' corresponding to the executable macro file 19 is placed on the desktop 18'. The macro file 19 includes an executable macro (e.g., the packaged list of actions) and sufficient executable information to invoke the original application so that when activated, the macro file 19 is executed in the invoked application program and extracts the list of actions and applies the macro, i.e., list of actions to the data file 21.

The icon 19 takes advantage of the so-called drag and drop feature common in window-type operating systems. Therefore, the user can drag any number of data files 21 to the macro icon 19' and the macro file 19 includes a sequence of operations to call a host application that can apply the actions in the macro to each of the data files 21.

Figure 2:
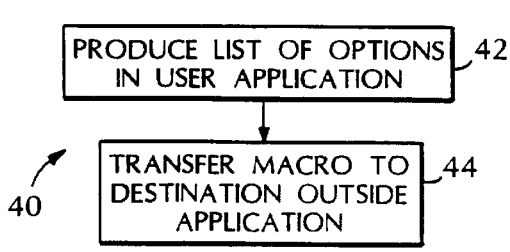
FIG. 2 is a flow chart of a macro generation process.

Referring now to FIG. 2, a process 40 in the application program 22b for producing macro file 19 includes producing 42 a macro list of actions in which a user selects the series of actions to apply to a data file. The user can select the action from a list of known actions to produce the macro file 19. The list of actions can be presented in a palette, for example, or other type of macro generator depending on the application program 22b. The user can transfer 44 this macro file (or a pointer to the macro file, e.g., a Windows95 shortcut) to a destination that is outside of the memory address space of the application.

Figure 3:
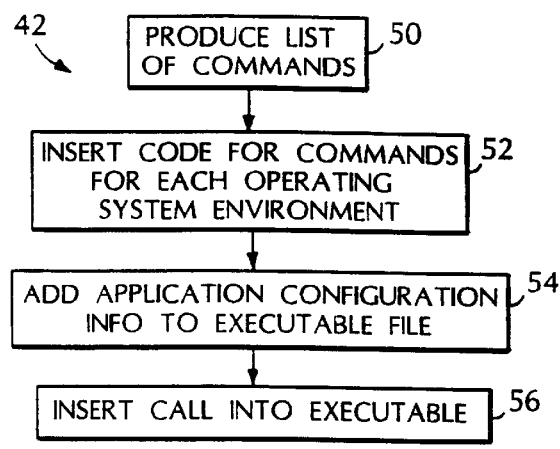
FIG. 3 is a flow chart showing details of the process of FIG. 2.

Referring now to FIG. 3, the process 42 for producing the macro file 19 includes producing 50 the list of actions within the application. Within the application program, the list of actions are packaged 52 into an executable file. Executable configuration information is also added 54 to the macro file 19. The application configuration information includes application code that enables the macro file 19 to invoke or call the original application program that produced the macro. Thus, for example, this type of application configuration information would typically include code such as OLE® (Object Linking and Embedding Microsoft Corp.) type code for Windows® based applications or DDE® (Dynamic Data Exchange, Microsoft Corp.) Apple Events®, for Macintosh operating systems (Apple Computer, Inc.) or CORBA (common object request broker architecture) for Unix® operating systems.

In one embodiment, the process 50 inserts 54 configuration code for each operating system environment that the macro can run under. Thus, for example, the macro file 19 can include configuration information for Windows95® operating system and a separate set for another operating system such as Macintosh® or Unix®. Typical combinations include Windows® and Macintosh, and Unix and Macintosh.

Figure 4:
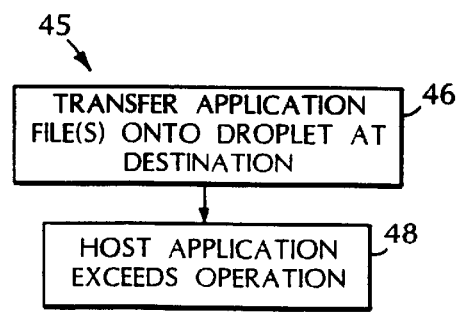
FIG. 4 is a flow chart showing a process to use a macro produced in conjunction with FIG. 2.

Referring now to FIG. 4, the process 44 for executing the macro includes transferring 46 data files 21 onto the macro file 19. The action of transferring an application file 21 invokes 48 the host application to execute the macro file and apply the actions to the application file 21. Transferring 46 application files onto the macro file 19 could involve a process such as dragging icons (not shown) representing the files 21, and dropping the icons onto the folder containing the macro file 19 or dropping the icons representing the files 21 directly onto the macro file 19. Alternatively, if the macro file 19 is represented as the icon 19' on the desktop 18', the icons representing the application files can be dropped onto the icon 19'.

Figure 5:
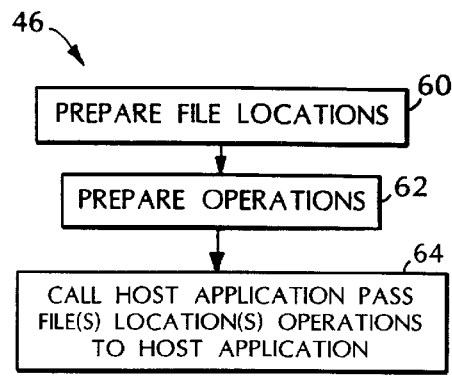
FIG. 5 is a flow chart showing details of the process of FIG. 4.

Referring now to FIG. 5, the process for transferring the application files 46 includes preparing the application files by providing a string that identifies the file locations and prepares the list of actions. The file locations and list of actions are transferred to the host application in the host application call 64. The icon 19' has associated with it sufficient information to identify the location of the underlying executable file 19. The underlying executable file 19 has sufficient information provided by insertion of the executable call to identify the name and location of the host application program associated with the macro file 19. Therefore, the application program can be remotely stored in a different computing environment than that of computer system 11.

Figure 6:
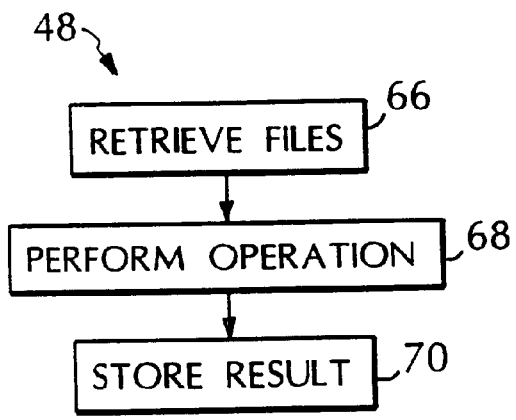
FIG. 6 is a flow chart showing details of the process of FIG. 4.

Referring now to FIG. 6, the host application executes 48 the macro by retrieving 66 the files, applies 68 the actions obtained from the list of actions to the retrieve files and can store 70 the retrieved files that result from performing the actions.

Figure 7:
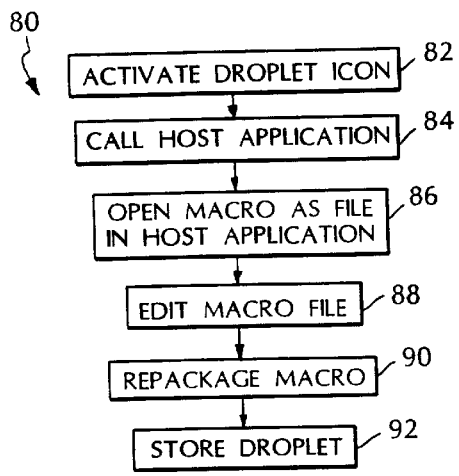
FIG. 7 is a flow chart showing details of a process used to edit a macro produced in accordance with FIG. 2.

Referring now to FIG. 7, a process 80 for editing the macro file 19 includes activating 82 the icon 19' to call the host application and open 84 the macro file 19 in a macro editor in the host application. Activating the macro editor produces the list of actions included in the macro file 19. The list of actions can be rendered on display 18. The list is edited 88, and the edited list is re-packaged 90 and is stored 92.

Figure 8A:
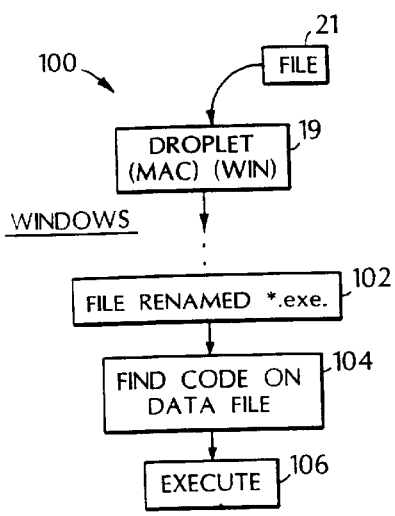
FIGS. 8A–8B are flow charts showing execution of a macro in heterogeneous environments.
Figure 8B:
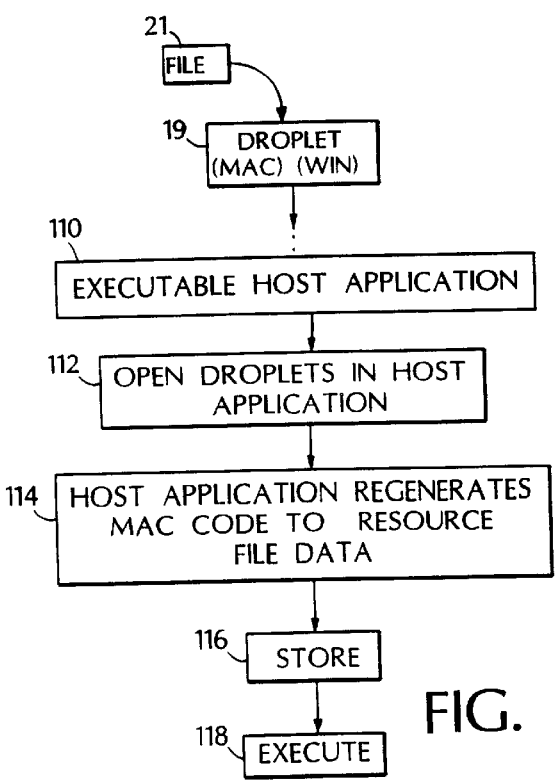

FIGS. 8A and 8B show a pair of sequences of operations to invoke an application program across a heterogeneous environment. The macro file 19 that is produced can run in any of a plurality of operating systems. Consider, for example, that the macro file 19 includes both Windows95 and Macintosh code.

Referring in particular to FIG. 8A, application file 21 is shown dropped on macro 19. The application file 21 is dropped from a Macintosh environment to a Windows environment. Macro file 19 includes Macintosh and Windows executable files. In a Macintosh environment, the file contains 680X0 configuration code in the resource fork and X86 configuration code in the data fork. Data fork and resource fork are file structure conventions in the Macintosh operating system. When the file is moved from the Macintosh to Windows95 environment, the resource fork data is lost. The X86 configuration code remains in the data fork, however. To execute the file, the file is renamed at 102. Typically, the file is renamed by the user to insure that it has an "*.exe" extension. This extension is the extension that a Windows executable would typically require. The application program finds 104 the code that invokes the application in the data fork and executes 106 the macro file 19.

Referring to FIG. 8B, file 21 can also be dropped from a Windows environment onto a macro file 19 which is in a Macintosh operating system environment. In the Windows environment, the file only contains the X86 configuration code in the data fork. To move to the Macintosh environment, the process executes 110 the host application and opens 112 the macro in the host application. The host application will detect that the resource fork data is missing and regenerate the Macintosh configuration code and store the code in the resource fork. Thereafter, the host application will store 116 the code and execute 118 the macro.

Figure 9:
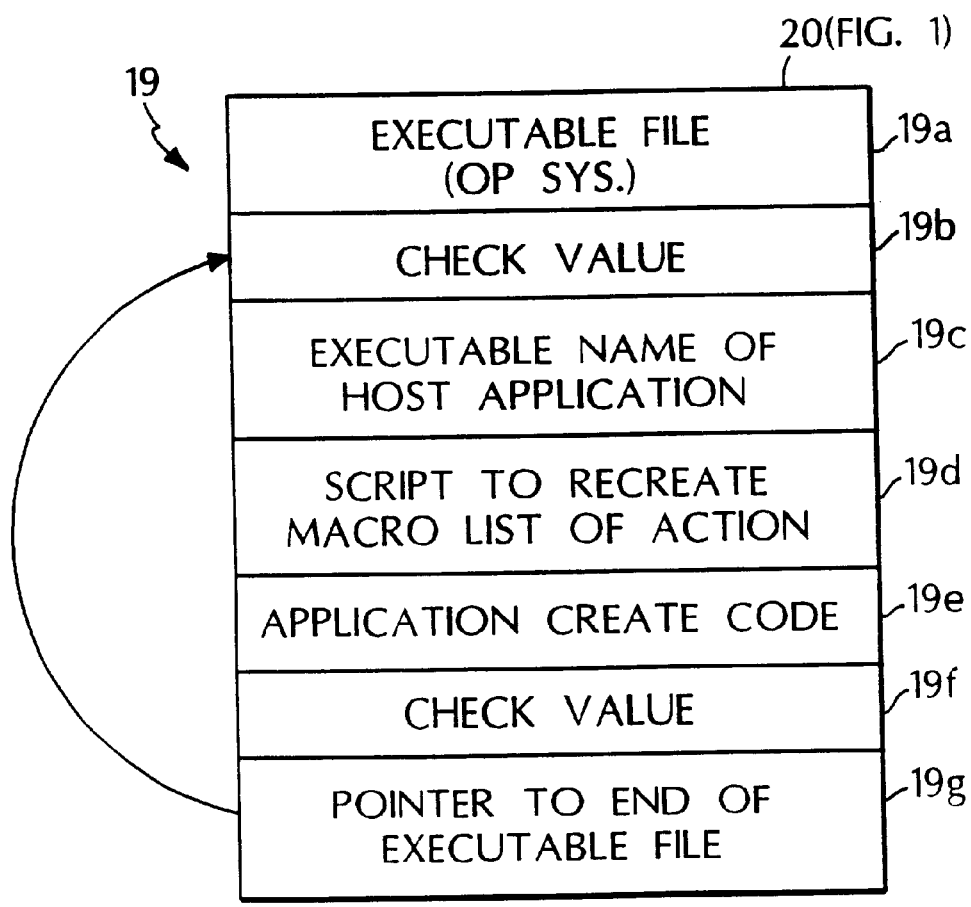
FIG. 9 is a data structure representing the macro.

Referring now to FIG. 9, the data structure 20 representing macro file 19 includes executable configuration code file 20a which stores the OLE or other remote application executable code. Dragging files onto the macro file 19 or icon 19' executes the configuration code in file 19a as an operating system process. This code sets up the files 21 and invokes the host application. The data structure 20 also includes an optional check value field 20b. The check value field 20b can be used to test the integrity of the data structure 20. The check value field 20b is populated with a value that is checked prior to execution. The data structure 20 includes a third field 20c corresponding to the executable name of the host application. The data structure 20 also includes a script field 20d which, when executed, recreates the macro list of operations. One preferred way of implementing the script field 20d is to use a Java® (Sun Microsystems) script program to recreate the list of operations. The data structure also includes an application creator code field 20e that is used for Macintosh type applications (i.e., storing Apple Events® code) and is the second operating system equivalent to the executable file field 20a. The data structure 20 may include a second, on time check value field 20f again having a value that is checked prior to execution. The data structure 20 includes a pointer 20g which points to the end of the executable file 20a. This identifies to the data structure 20 where the data structure actually starts.

Figure 10:
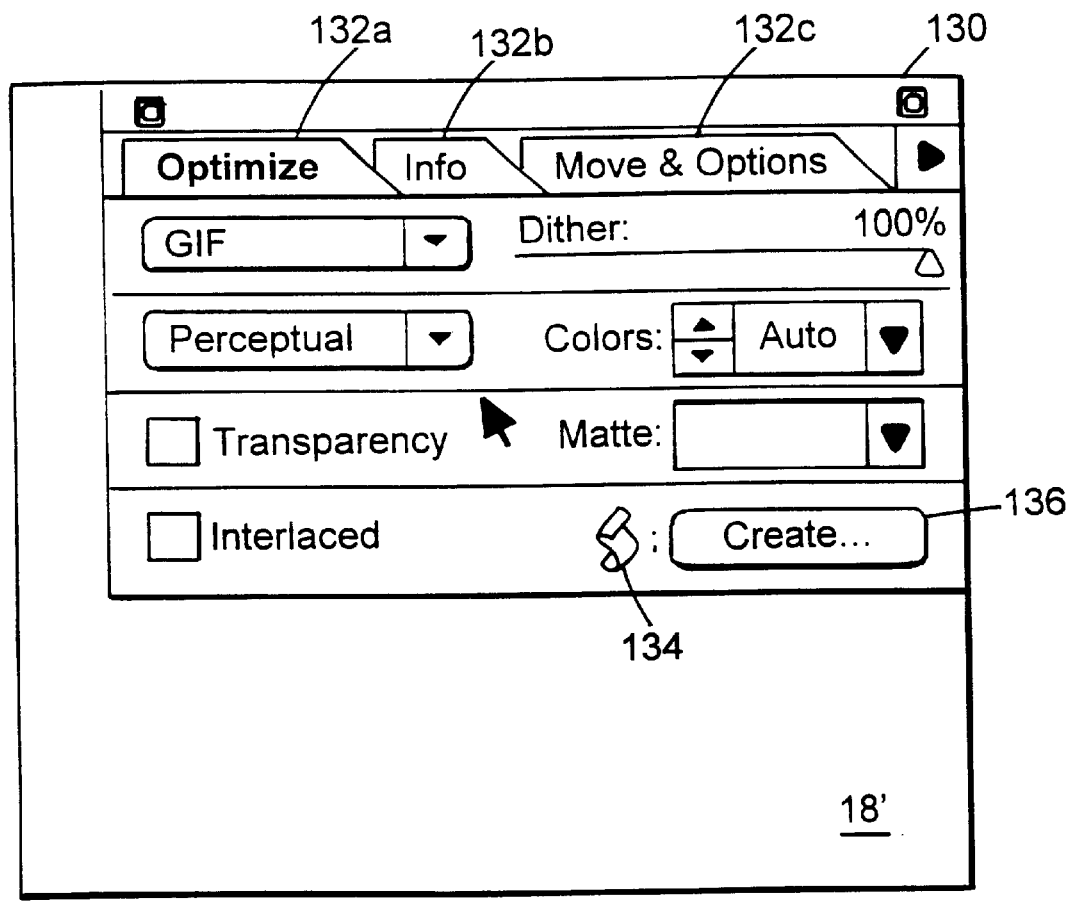
FIG. 10 is a diagram of a computer desktop including a dialog box.

Referring now to FIG. 10, the computer desktop 18' has a dialog box 130 opened. The dialog box 130 includes a plurality of tabs 132a–132c having different functions such as "optimze", "info" and "move options". In particular, the dialog box 130 includes an icon 134 that is associated with the macro file 19 opened in the application program 22a. The icon 134 can be dragged from the dialog box 130 and placed on the computer desktop 18'. As a result of dragging the icon 134, the macro file 19 is automatically stored in the desktop folder 22a and automatically assigned a name.

Figure 11:
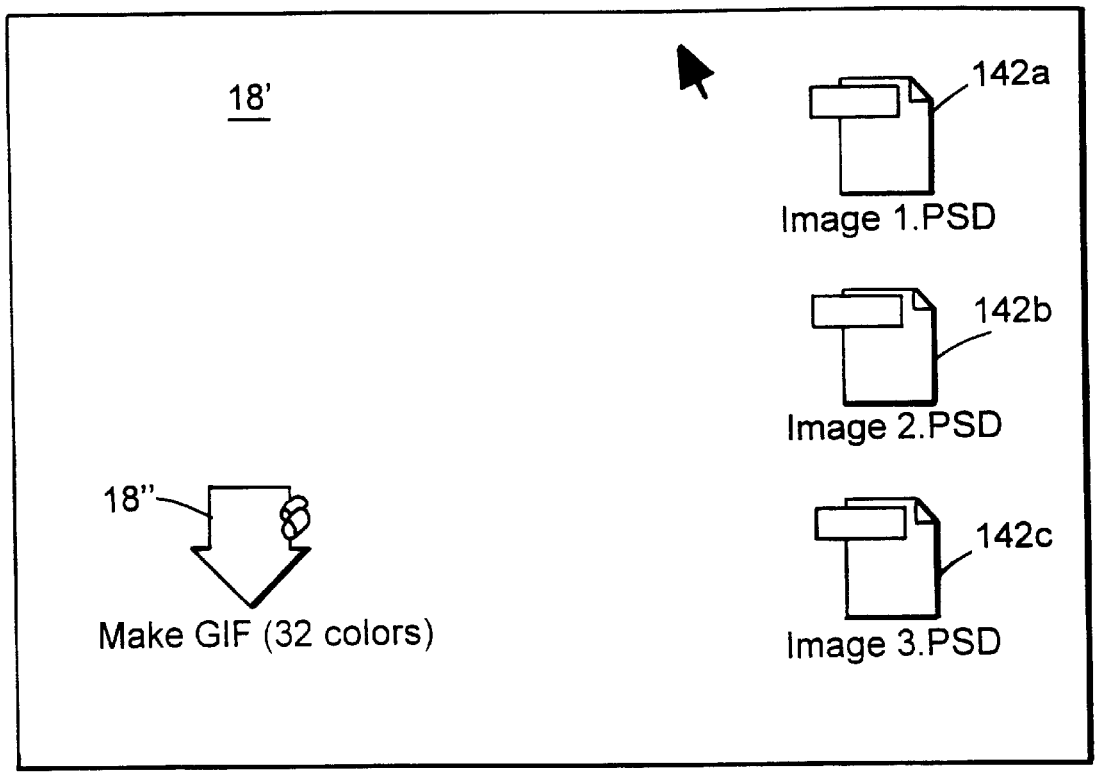
FIG. 11 is a diagram of a computer desktop having a macro file icon and data files.

Referring now to FIG. 11, the computer desktop 18' is shown as having the dragged icon 18" (provided from dragging icon 134) and three data files 142a–142c. The three data files can be dragged to the icon 18" causing the actions in the macro file 19 associated with the icon 18" to be applied to the data files 142a–142c.

Alternatively, the macro file 19 can be moved to the computer desktop or elsewhere in the computer system 11 by pushing the "create" button 136. The create button 136 can have a second dialog box (not shown) appear having locations for a file name for the icon and a storage location for the icon.

Figure 12:
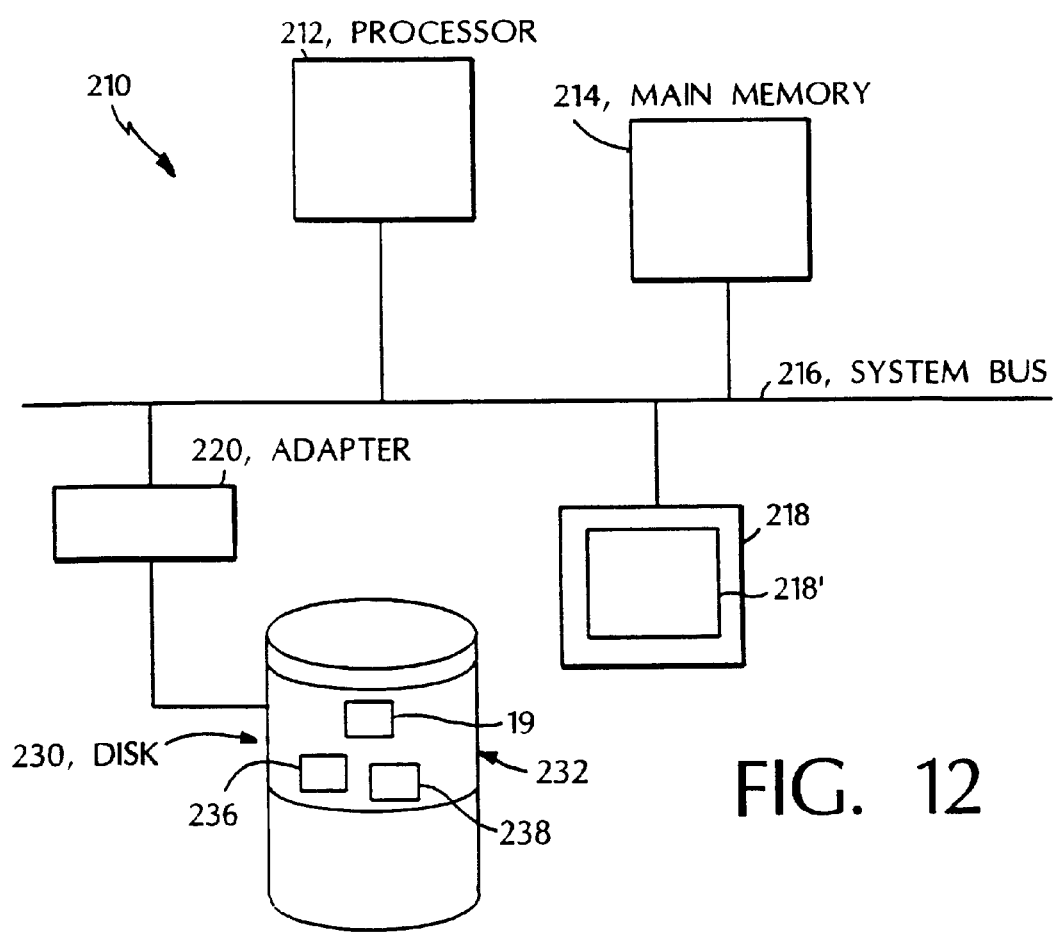
FIG. 12 is block diagram of a computer system.

Referring now to FIG. 12, a computer system 210 includes a processor 212, a main memory 214, display 218, and storage adapter 220 all coupled together via a computer system bus 216. The storage adapter 220 couples a storage device 230 such as a hard disk drive to the system bus 216. Computer system 210 operates under an operating system and includes an application program 232 shown on disk drive 230 having associated therewith a macro file 19.

The application program 230 includes a log file such as a history palette 236 that records commands that were executed by a user in modifying the state of a data file 238 associated with the application program 22a. This history palette 236, therefore, has a list of all commands generally in the sequence issued by the user that when executed or reversed will modify the state of the data file 238. The application can also include a macro generator such as an action palette 239 that contains a list of macros that can be applied to a data file. The action palette can be used to record macros and save them in a macro file for later use in the application.

Figure 13:
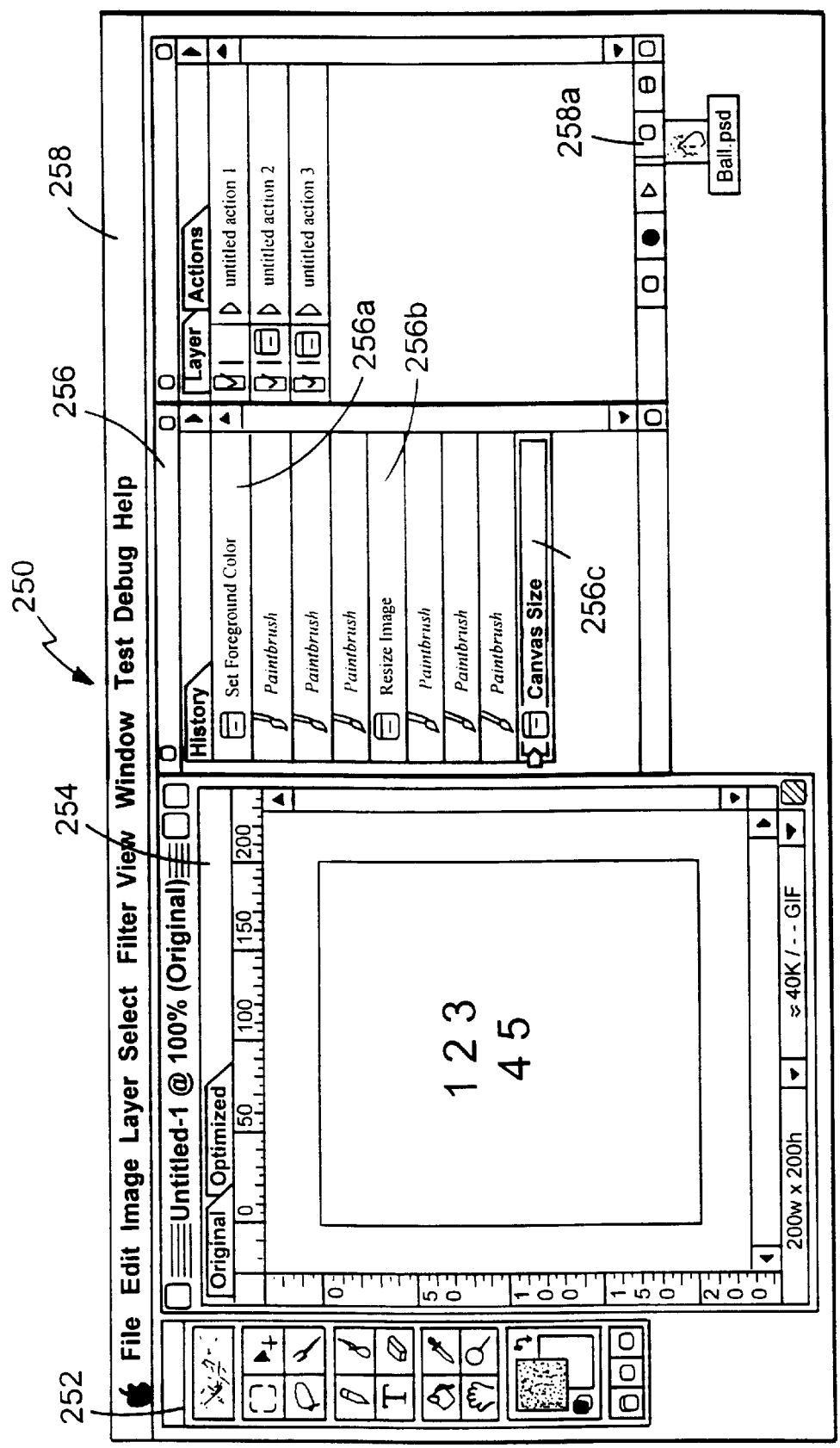
FIGS. 13–16 are diagrams of windows useful in understanding the processes of FIGS. 13 and 14.

Referring to FIG. 13, a window 250 is shown in various stages of use. The window 250 has a tool palette 252, user work space 254, history palette 256 to store and display actions or commands applied to a data file (not shown), as defined by the user in the work space 254, and an action palette used to produce macros. The history palette 256 displays the commands 256a–256c that were applied to the user work space 254. The action palette has a button 258a for initiating a macro record mode.

Figure 14:
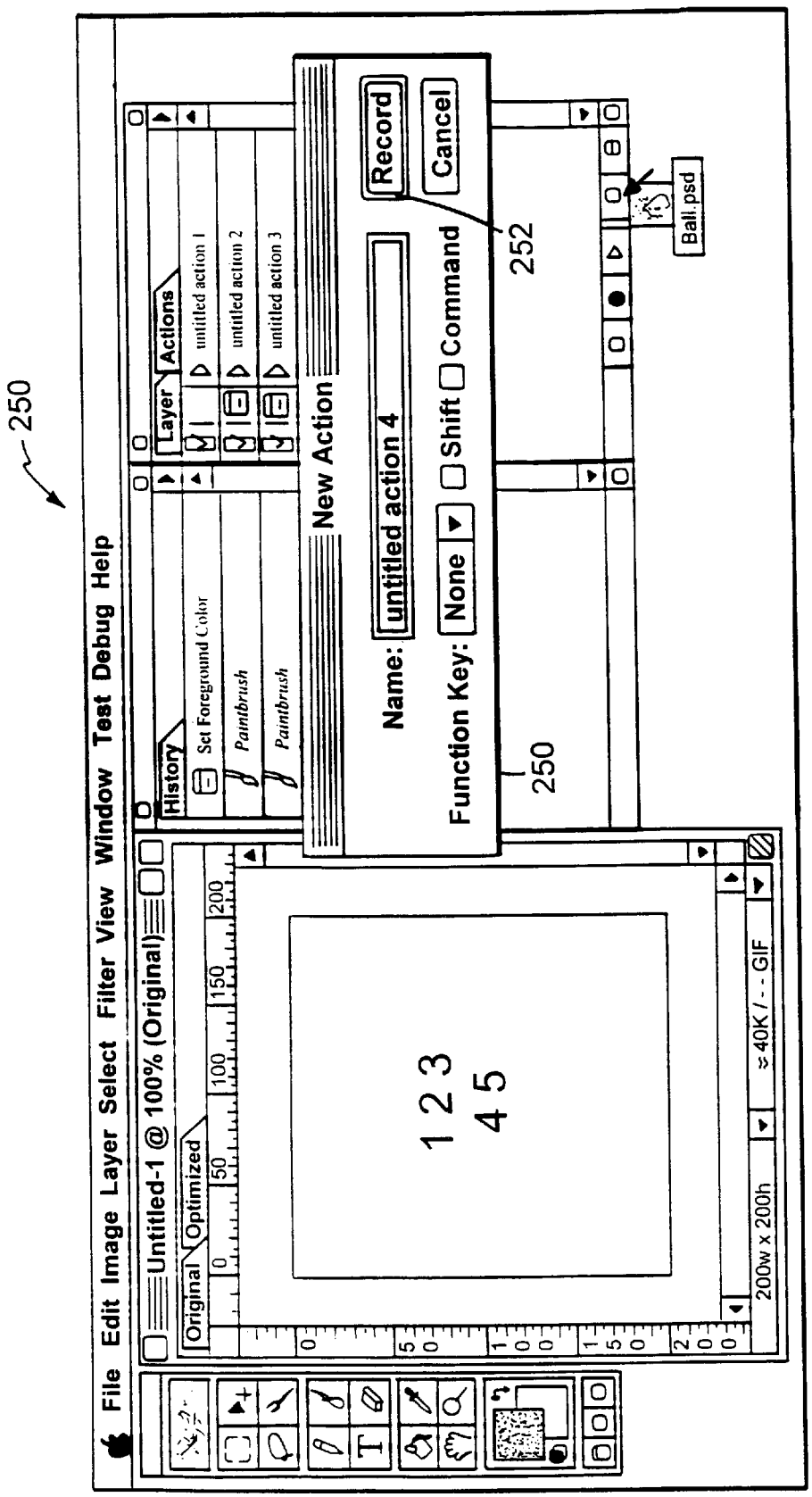

Referring to FIG. 14, the window 250 has a dialog box 260 displayed with a record button 262. Dialog box 260 is a new action (macro) box enabling a user to record a macro and name the macro. It is invoked by a user pressing the button 258a (FIG. 13).

Figure 15:
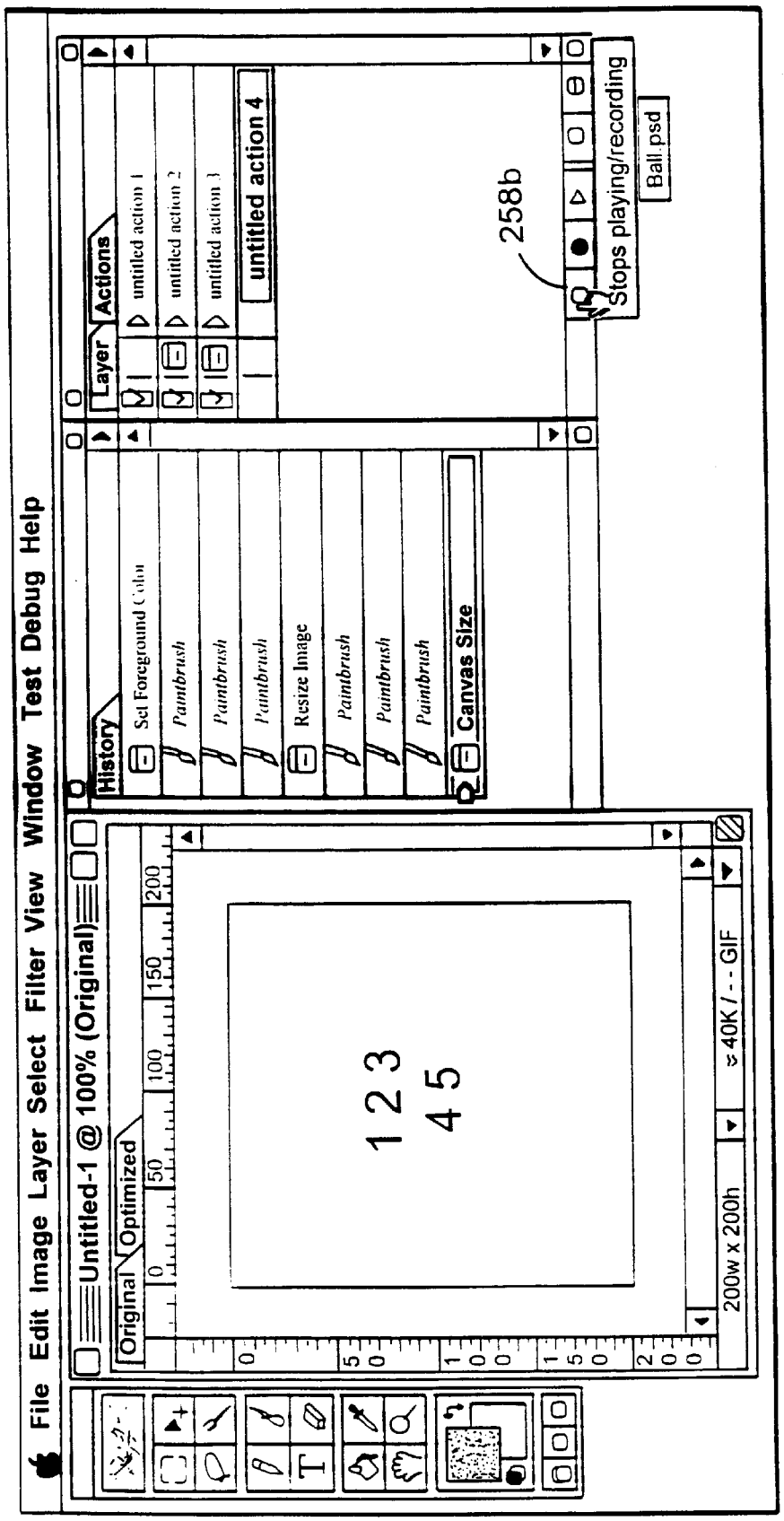

Referring now to FIG. 15, the window depicts a stop button 258b on the action palette 258. The assertion of the stop button immediately after the assertion of the record button 262 causes an empty macro file to be generated. Of course, the macro file can be generated to have some commands and additional commands can be added as will be described below.

Figure 16:
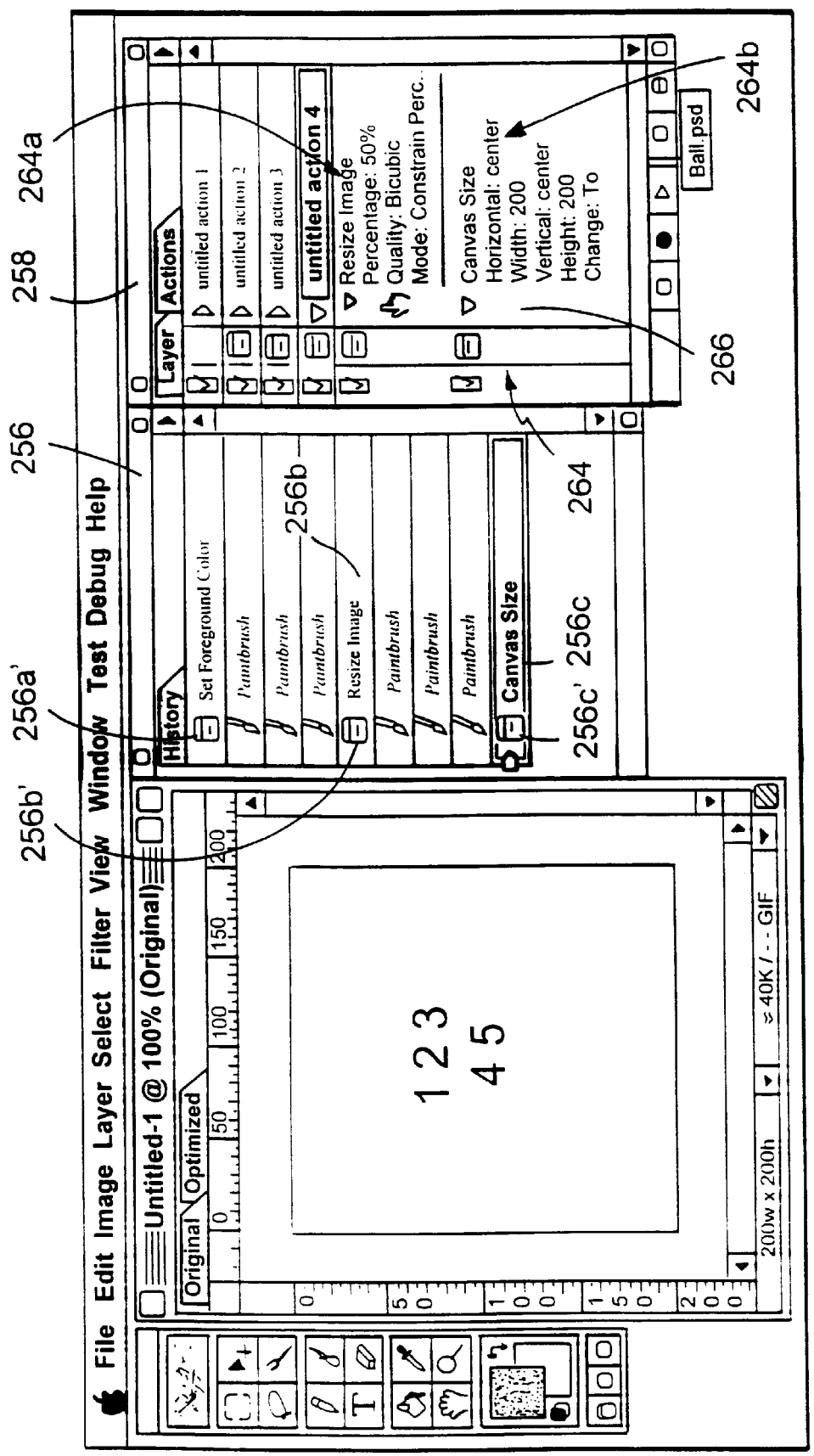

Referring now to FIG. 16, the window 250 has the action palette populated with a new action 264 including new commands 264a and 264b provided by dragging icons 256b' and 256c' (corresponding to commands 256b and 256c) from the history palette 256. Icon 256a' is not dragged since a user does not wish to apply the corresponding command 256a to the macro. In the action palette 258, arrows 266 are shown in an open, i.e., down position, so that the details of the commands can be depicted.

Figure 17:
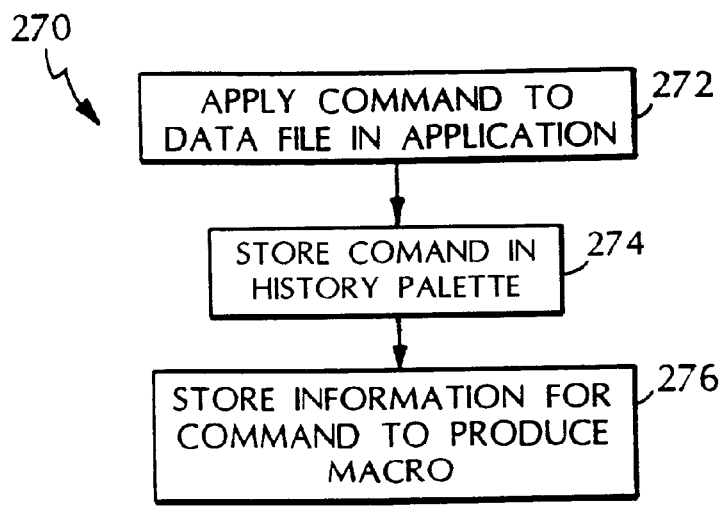
FIG. 17 is a flow chart of a process to store commands.

Referring now to FIG. 17, a process 270 for storing commands applied to a data file is shown. A user applies 272 commands to a data file that is opened in the application program 230. These actions are stored 274 in a log such as the history palette 256 (FIG. 13) which displays a list of the commands applied by the user. Macro information that would be needed to place these commands into a macro file is also stored 276.

Figure 18:
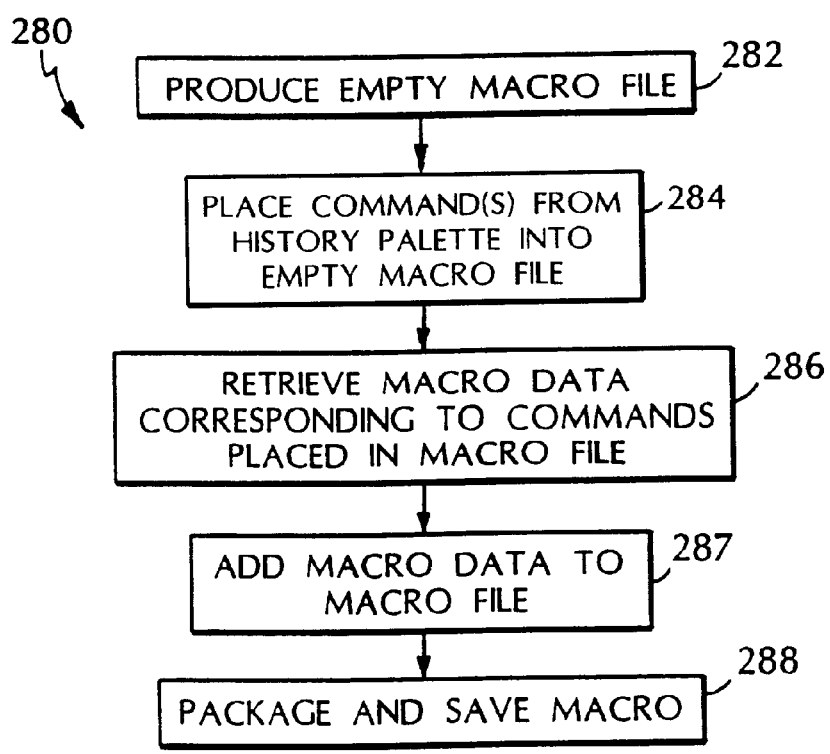
FIG. 18 is a flow chart of a process to generate a macro.

Referring now to FIG. 18, a process 280 to create a macro file is shown. This process can be used separately or in conjunction with the process described in conjunction with FIGS. 1–11 above. The user can produce an empty macro file. This can be accomplished by launching the action palette (i.e., pressing button 258a (FIG. 13) and pressing record 252 (FIG. 14) and stop 258b (FIG. 16). Commands are placed 284 from the history palette 258 (FIG. 13) into the empty macro file. These commands can be placed by dragging icons 256a'–256c' (FIG. 17) from the history palette into the action palette or another file associated with a different type of macro generator. The process can be configured to have the action of dragging icons 256a'–256c' either move or copy the icons and hence the underlying commands from the history palette to the action palette. The process 280 retrieves 286, and adds 287, the macro data (such as macro data structure 20 FIG. 9, for example) associated with the command that was placed in the empty macro file. The macro file is packaged and saved 288.

Accordingly, a user can apply a sequence of commands to a data file and thereafter decide to make those commands into a macro by retrieving all or selected ones of the actions and placing them into the action palette producing macro file. Rather, than exclusively using a conventional macro generator, a user can select actions from the history palette by dragging selected commands to the macro file in the action palette or other macro generator. There is no need for the user to try and recreate the commands applied to a data file since the commands are stored in the history palette or log in such a manner that they can later be applied by the user to a macro. As above, the macro file can be represented by a macro icon 19' and icons corresponding to data files can be dragged onto the icon 19' enabling the icon 19' to execute the macro operations defined therein and apply those actions to each one of the files as a batch operation.

Other embodiments are within the scope of the following claims.

What is claimed is:

1. A method of producing a macro file for use by an application program comprising:

producing a macro file including at least two versions of configuration code corresponding to two different operating systems to interface the macro file to an application program;

attaching to the macro file a sequence of actions to apply to an application file, said sequence of actions providing the macro file with the sequence of actions produced by use of the application program; and attaching application identification information to the macro file that identifies an original host application corresponding to the macro file.

2. The method of attaching application identification information further comprises inserting a call to the application program that produced the macro file into the executable.

3. The method of claim 1 wherein the configuration code for at least two versions is executable configuration code.

4. The method of claim 1 wherein the macro file is stored independent of the application program in an address location outside of an application program address space.

5. The method of claim 1 further comprising:

transferring the macro file on a computer storage medium.

6. The method of claim 5, further comprising:

transferring the macro file to a folder corresponding to a computer desktop folder such that an icon pointing to the macro file can be displayed on the computer desktop.

7. A computer program product residing on a computer readable medium for producing a macro for use by an application program comprising instructions for causing a computer to:

produce a macro file including executable configuration code to interface the macro file to an application program;

insert at least two versions of executable configuration code corresponding to two different operating systems;

attach to the macro file a sequence of actions to apply to an application file produced by the application program;

package the sequence of actions into an executable; and attach application identification information to the macro file that identifies an original host application corresponding to the macro file and to insert a call to the application program into the macro file.

8. A data structure stored on a computer readable medium representing a macro file, said data structure comprising:

a field for a first executable configuration code for invoking an application program in a first environment;

a field for a second executable configuration code for invoking the application program in a second environment;

a field corresponding to an executable call to the application program; and a script file corresponding to a list of actions that are applied to an application program file.

9. The data structure of claim 8, further comprising: a pointer to the end of the first executable.

10. The data structure of claim 8, further comprising a level one check value field.

* * * * *

UNITED STATES PATENT AND TRADEMARK OFFICE
CERTIFICATE OF CORRECTION

PATENT NO.   : 6,357,038 B1
DATED        : March 12, 2002
INVENTOR(S)  : Eric A. Scouten It is certified that error appears in the above-identified patent and that said Letters Patent is hereby corrected as shown below:

<u>Title page,</u>
Item [56], References Cited, U.S. PATENT DOCUMENTS, after "Smith, Jr." please delete "714".

<u>Column 7,</u>
Line 60, please delete "a macro" and insert -- an executable macro -- therefor.

<u>Column 8,</u>
Line 10, after "The method of" please insert -- claim 1 wherein --.

Signed and Sealed this

Third Day of September, 2002

Attest:

Attesting Officer

JAMES E. ROGAN
Director of the United States Patent and Trademark Office